2,838,458
Patented June 10, 1958

2,838,458

INHIBITED METHYL CHLOROFORM

Howard J. Bachtel, Lake Jackson, Tex., assignor to The Dow Chemical Company, Midland, Mich., a corporation of Delaware No Drawing. Application September 30, 1955
Serial No. 537,903

5 Claims. (Cl. 252—171)

This invention relates to the degreasing of metals and to a stabilized solvent therefor composed of methyl chloroform containing a mixture of inhibitors effective to prevent the decomposition thereof when in contact with metallic surfaces.

It is well known that the common chlorinated aliphatic hydrocarbons, which are used as solvents for degreasing metals, dry-cleaning, and other purposes, are subject to decomposition on contact with metallic surfaces and cause corrosion of such surfaces. It has long been customary to add a corrosion inhibitor to such solvents to stabilize them against decomposition and prevent or suppress corrosive attack upon metallic surfaces with which they come in contact. A great multiplicity of agents have been proposed as corrosion inhibitors for such chlorinated solvents, but generally speaking the effectiveness of a particular inhibitor for a particular chlorinated solvent cannot be predicted.

Methyl chloroform (1,1,1-trichloroethane) is an excellent grease solvent, but is highly sensitive to decomposition in contact with common metals, particularly aluminum and iron. The inhibitors which are commercially affective with other chlorinated solvents are not satisfactory for methyl chloroform. An effective corrosion inhibitor for methyl chloroform is much to be desired, so that its properties as a degreasing solvent may be made available to industry.

Although it has been stated in U. S. Patents Nos. 2,371,644 and 2,371,645 that monohydric aliphatic alcohols and organic ethers act as inhibitors for certain chlorinated hydrocarbon solvents, particularly when the solvent is in contact with aluminum, nevertheless such alcohols and, with the exception of 1,4-dioxane, such ethers, alone, are quite ineffective as inhibitors or stabilizers for methyl chloroform. In my prior application Serial No. 419,913, filed March 30, 1954, now Patent No. 2,811,252, I have shown that 1,4-dioxane and mixtures thereof with a minor amount of a secondary or tertiary aliphatic alcohol are effective inhibitors for methyl chloroform when in contact with surfaces of iron or aluminum, the protective action of the inhibitor being obtained at elevated as well as normal temperatures when the metal surface is immersed in the liquid. However, 1,4-dioxane and its mixtures with the said alcohols are not entirely effective in preventing the corrosion of metallic surfaces of iron or aluminum which are exposed to condensing vapors of methyl chloroform entrained with liquid at boiling temperatures. This is a disadvantage in a degreasing or dry-cleaning process where the saturated vapors of methyl chloroform are to be condensed in contact with a metallic surface of iron or aluminum, since in time substantial corrosion of the metal surfaces and contamination of the solvent may occur.

I have now found, however, that the corrosiveness of methyl chloroform to common metals is reduced to a degree not heretofore attained, when there is added to it a stabilizing amount of 1,4-dioxane together with a lower aliphatic monohydric acetylenic alcohol. Ordinarily about 2.5 to 10 percent by volume of 1,4-dioxane and about 0.01 to 10 percent by volume of a lower aliphatic acetylenic alcohol are dissolved in the methyl chloroform, the preferred amounts being 3 to 7.5 percent of dioxane and 0.05 to 3.0 percent of the acetylenic alcohol.

It is, therefore, the principal object of this invention to provide a stabilized degreasing solvent, which is substantially stable and non-corrosive to common metals, consisting essentially of methyl chloroform containing an effective amount of a lower aliphatic monohydric acetylenic alcohol and of 1,4-dioxane to inhibit the corrosiveness of methyl chloroform to metals.

In the new compositions, the lower aliphatic monohydric acetylenic alcohol is one containing less than 8 carbon atoms. The alcohol having a general type formula of

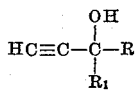

where R and $R_1$ are alkyl groups, is especially effective. Of the alcohols, 2-methyl-3-butyn-2-ol (dimethyl ethinyl carbinol) is preferred. However, other aliphatic monohydric acetylenic alcohols having less than 8 carbon atoms per molecule may be used, e. g. 3-methyl-1-pentyn-3-ol (methyl ethyl ethinyl carbinol), 2-butyn-1-ol (propinyl carbinol), 2-methyl-3-hexyn-2-ol (1-butynyl dimethyl carbinol), and 2-propyn-1-ol (propargyl alcohol).

Methyl chloroform stabilized according to the invention is effectively inhibited so that it is substantially non-corrosive to metals under conditions generally encountered in use, shipment and storage. Aluminum, iron, copper, zinc and alloys thereof may be exposed to the condensing vapors of the stabilized composition continuously for long periods of time without being attacked or the methyl chloroform solution decomposing or discoloring. This composition may also be stored in metal drums of iron or aluminum for months without attacking the containers and wtihout decomposition or discloration of the solution. Such results are not attainable by other inhibitors now known.

For most purposes, the inhibiting agents of the invention are added individually soon after the manufacture of the methyl chloroform. However, a concentrate consisting essentially of the 1,4-dioxane and a lesser but substantial proportion of the acetylenic alcohol, and optionally some methyl chloroform, may be prepared. This concentrate may be added to methyl chloroform which has not been stabilized or used to replenish the inhibitor where the stability of the inhibited solvent has been diminished due to long severe use.

The following examples will illustrate the invention.

Example 1

To demonstrate the problem, a test run was made on methyl chloroform containing no stabilizer. The test metal was a strip of commercial sheet aluminum 3S (an aluminum base alloy containing 1.25 percent manganese, balance substantially aluminum). The strip was placed in a glass beaker and covered with methyl chloroform at room temperature. While thus immersed, the strip was scratched 10 times with a hard needle to expose fresh surface of aluminum. Reaction of methyl chloroform with the aluminum began at once, liberating carbon in visible form. After 30 minutes, the beaker was filled with a nearly dry black mass of carbon, and the aluminum was badly corroded all over and eaten through in places.

The same procedure was carried out using methyl chloroform containing 3.5 percent dioxane and 0.1 percent 2-methyl-3-butyn-1-ol, by volume. After 30 minutes the aluminum was unaffected, remaining bright at the scratches. The methyl chloroform was likewise water-white and unaffected.

*Example 2*

Into a large glass flask was placed 1 liter of methyl chloroform containing 3 percent by volume of dioxane. This flask was equipped with a reflux condenser so that, when the contents of the flask were boiled, the vapors leaving the flask would condense in the condenser and return to the flask. Freshly scratched strips of aluminum were placed in the bottom of the flask and in the reflux condenser. The test strips placed in the reflux condenser were arranged so that at all times they would be in contact with saturated vapor and the refluxing liquid when the contents of the flask were boiled. With the test strips placed, as described above, the methyl chloroform containing 3 percent by volume of 1,4-dioxane was boiled, subjecting the test strips to saturated vapor and boiling liquid. After five hours, the contents of the flask showed extensive decomposition resulting from reaction with the test strip in the vapor phase.

The same procedure was followed using 1 liter of methyl chloroform containing 3 percent by volume of 2-methyl-3-butyn-2-ol. After one hour, the contents of the flask showed extensive decomposition due to reaction with the metal in the vapor phase.

In a similar test, but where 1 liter of methyl chloroform containing 3 percent of dioxane and 0.2 percent of 2-methyl-3-butyn-2-ol by volume was used, after 45 days there was no evidence of decomposition or reaction in either the vapor or liquid phase.

*Example 3*

Methyl chloroform containing 4 percent by volume of 1,4-dioxane was stored at room temperature for two months in a standard black iron (sheet steel) shipping drum. The drum was not significantly attacked and the methyl chloroform showed no signs of decomposition, although it did develop a rusty coloration.

An identical test was performed with methyl chloroform containing 2.5 percent 1,4-dioxane and 0.3 percent 2-methyl-3-butyn-2-ol, by volume. The drum was unaffected and the contents were water white.

*Example 4*

A flask was partly filled with methyl chloroform and a number of iron bolts were inserted. The whole was then heated to boiling. After ten minutes, the methyl chloroform began to attack the iron and rapidly decomposed to form carbon.

In a comparison test, methyl chloroform containing 2.5 percent 1,4-dioxane and 0.3 percent 2-methyl-3-butyn-2-ol by volume was boiled under reflux in contact with iron bolts. No coloration was produced for nine days and at the end of 14 days, the coloration was still only slight.

*Example 5*

Methyl chloroform containing 3 percent of 1,4-dioxane and 0.3 percent of 2-methyl-3-butyn-2-ol by volume, was placed in a standard aluminum drum. To simulate tropical conditions, this drum was stored at temperatures ranging from 70 to 110° F. for four months. At the end of this time, the drum was unaffected and the contents were water white.

*Example 6*

A degreasing unit was charged with 15 gallons of methyl chloroform containing 4 percent of 1,4-dioxane and 0.25 percent of 2-methyl-3-butyn-2-ol by volume. The unit was operated continuously for 148 hours cleaning and degreasing test samples of black iron, galvanized iron, copper and aluminum in the vapor phase. After contacting the test samples for 148 hours, there was no visible sign that the metals were attacked or that the solvent had undergone any decomposition. The metals remained bright and unaffected.

It can be seen from the foregoing examples that methyl chloroform is effectively stabilized and protection is afforded to metals from the corrosivity of methyl chloroform solvent in both liquid and vapor phases by addition to the methyl chloroform, as a stabilizer, a mixture of a lower aliphatic monohydric acetylenic alcohol and 1,4-dioxane. Example 2 shows that the effectiveness as a corrosion inhibitor of this mixture is far superior to that of either of the components alone or their mere additive effect.

I claim:

1. A composition of matter consisting essentially of methyl chloroform having dissolved therein, to inhibit the corrosiveness of methyl chloroform to metals, from 2.5 to 10 percent by volume of 1,4-dioxane and from 0.01 to 10 percent by volume of a lower aliphatic monohydric acetylenic alcohol containing less than 8 carbon atoms.

2. A composition of matter consisting essentially of methyl chloroform having dissolved therein, to inhibit the corrosiveness of methyl chloroform to metals, from 2.5 to 10 percent by volume of 1,4-dioxane and from 0.01 to 10 percent by volume of a lower aliphatic monohydric acetylenic alcohol having less than 8 carbon atoms per molecule, which has a general type formula

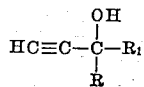

where R and $R_1$ are alkyl groups.

3. A composition of matter consisting essentially of methyl chloroform having dissolved therein, to inhibit the corrosiveness of methyl chloroform to metals, from 2.5 to 10 percent by volume of dioxane and from 0.01 to 10 percent by volume of 2-methyl-3-butyn-2-ol.

4. In a process where methyl chloroform is contacted with one of the metals, aluminum, iron, copper and zinc, the method of inhibiting the corrosiveness of methyl chloroform which comprises of maintaining from 2.5 to 10 percent by volume of 1,4-dioxane and from 0.01 to 10 percent by volume of 2-methyl-3-butyn-2-ol dissolved in the methyl chloroform.

5. In a process where saturated vapor of methyl chloroform is contacted with one of the metals aluminum, iron, copper and zinc, the method of inhibiting the corrosiveness of the methyl chloroform which comprises maintaining from 2.5 to 10 percent by volume of 1,4-dioxane and from 0.01 to 10 percent by volume of 2-methyl-3-butyn-2-ol dissolved in the methyl chloroform prior to the vaporization of the said liquid.

References Cited in the file of this patent

UNITED STATES PATENTS

| | | |
|---|---|---|
| 1,948,045 | Parkhurst | Feb. 20, 1934 |
| 2,364,588 | Morris et al. | Dec. 5, 1944 |
| 2,371,644 | Petering et al. | Mar. 20, 1945 |
| 2,371,645 | Aitchison et al. | Mar. 20, 1945 |
| 2,376,075 | Morris et al. | May 15, 1945 |
| 2,399,205 | Campbell | Apr. 30, 1946 |
| 2,407,149 | Gardenier | Sept. 3, 1946 |
| 2,721,883 | Stevens | Oct. 25, 1955 |

FOREIGN PATENTS

| | | |
|---|---|---|
| 353,858 | France | July 10, 1905 |